US012688232B1

(12) United States Patent　　　　(10) Patent No.:　US 12,688,232 B1
Bhattacharjee et al.　　　　　　　(45) Date of Patent:　　Jul. 21, 2026

(54) STANDARDIZING PROXIMITY CALCULATIONS

(71) Applicant: Honeywell International Inc., Charlotte, NC (US)

(72) Inventors: Arnab Bhattacharjee, Bengaluru (IN); Amit Chotiya, Jaipur (IN); Ankit Hotchandani, Bengaluru (IN); Nikhil Bansal, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/928,487

(22) Filed: Oct. 28, 2024

(51) Int. Cl.
　　*G06F 16/901*　　(2019.01)
　　*G06F 16/903*　　(2019.01)
　　*G05B 23/02*　　(2006.01)

(52) U.S. Cl.
　　CPC .... *G06F 16/9024* (2019.01); *G06F 16/90335* (2019.01); *G05B 23/027* (2013.01)

(58) Field of Classification Search
　　CPC ........... G06F 16/9024; G06F 16/90335; G05B 23/027
　　USPC ........................................................ 707/798
　　See application file for complete search history.

(56)　　　　　　References Cited

U.S. PATENT DOCUMENTS

| | | | |
|---|---|---|---|
| 10,721,609 B1* | 7/2020 | Blythe | H04W 4/90 |
| 2017/0039228 A1* | 2/2017 | Skafi | G06F 16/2329 |
| 2018/0321356 A1 | 11/2018 | Kulkarni et al. | |
| 2019/0339687 A1 | 11/2019 | Cella et al. | |
| 2021/0182793 A1* | 6/2021 | Patel | G06Q 20/40155 |
| 2022/0187815 A1 | 6/2022 | Sinha et al. | |
| 2022/0318308 A1 | 10/2022 | Dean et al. | |
| 2022/0358424 A1* | 11/2022 | Kulkarni | G06Q 10/0633 |

* cited by examiner

*Primary Examiner* — Giovanna B Colan

(57)　　　　　　ABSTRACT

Devices, methods, and systems for standardizing proximity calculations are described herein. A method can include setting, by a computing device, a proximity attribute for each of a plurality of equipment relationship attributes for a user, receiving, by the computing device, a plurality of equipment items each having one of the plurality of equipment relationship attributes to another one of the plurality of equipment items, creating, by the computing device, a graph diagram including each of the plurality of equipment items coupled to one another by their respective equipment relationship attributes and the proximity attribute for their respective equipment relationship attributes, calculating, by the computing device using the graph diagram, a proximity between two of the plurality of equipment items, and providing, by the computing device, the calculated proximity to the user.

18 Claims, 10 Drawing Sheets

440                                                442

| # | EQUIPMENT RELATIONSHIP ATTRIBUTE | PROXIMITY ATTRIBUTE |
|---|---|---|
| 1 | CONNECTED TO | 1 |
| 2 | SENDS FEED TO | 1 |
| 3 | ALIAS OF | 0 |
| 4 | PARENT OF | 1 |

| # | EQUIPMENT RELATIONSHIP ATTRIBUTE | PROXIMITY ATTRIBUTE USER A | PROXIMITY ATTRIBUTE USER B |
|---|---|---|---|
| 1 | CONNECTED TO | 1 | 1 |
| 2 | SENDS FEED TO | 1 | 1 |
| 3 | ALIAS OF | 0 | 1 |
| 4 | PARENT OF | 1 | 1 |

Fig. 6

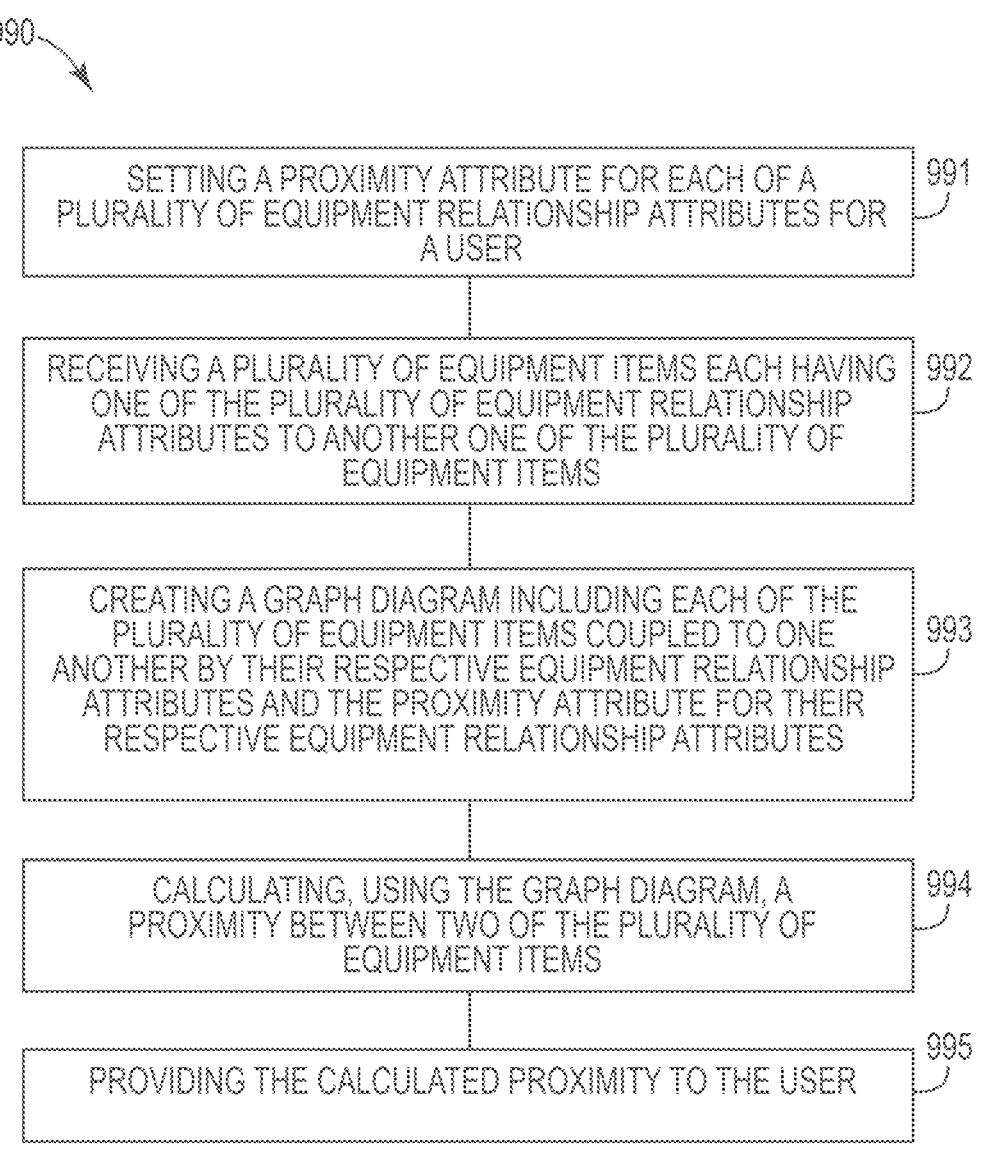

990

| |
|---|
| SETTING A PROXIMITY ATTRIBUTE FOR EACH OF A PLURALITY OF EQUIPMENT RELATIONSHIP ATTRIBUTES FOR A USER |

991

| |
|---|
| RECEIVING A PLURALITY OF EQUIPMENT ITEMS EACH HAVING ONE OF THE PLURALITY OF EQUIPMENT RELATIONSHIP ATTRIBUTES TO ANOTHER ONE OF THE PLURALITY OF EQUIPMENT ITEMS |

992

| |
|---|
| CREATING A GRAPH DIAGRAM INCLUDING EACH OF THE PLURALITY OF EQUIPMENT ITEMS COUPLED TO ONE ANOTHER BY THEIR RESPECTIVE EQUIPMENT RELATIONSHIP ATTRIBUTES AND THE PROXIMITY ATTRIBUTE FOR THEIR RESPECTIVE EQUIPMENT RELATIONSHIP ATTRIBUTES |

993

| |
|---|
| CALCULATING, USING THE GRAPH DIAGRAM, A PROXIMITY BETWEEN TWO OF THE PLURALITY OF EQUIPMENT ITEMS |

994

| |
|---|
| PROVIDING THE CALCULATED PROXIMITY TO THE USER |

STANDARDIZING PROXIMITY CALCULATIONS

TECHNICAL FIELD

The present disclosure relates generally to devices, methods, and systems for standardizing proximity calculations.

BACKGROUND

For a site such as a plant, a factory, or other enterprise, representing equipment such as physical objects, spatial assets, and/or other items in a digitized way to create a representation of the site which can be leveraged for decision-making by human assisted or artificial intelligence (AI) enabled agents can be a challenge. One approach to meet this challenge has been to create a graph representation of all assets and/or items with spatial awareness logic built in so that a user (e.g., consumer) can scan through the graph to understand the spatial distance between the items in the graph and make decisions.

BRIEF DESCRIPTION OF THE DRAWINGS

FIG. 4 illustrates a table of equipment relationship attributes and their respective proximity attribute in accordance with an embodiment of the present disclosure.

FIG. 6 illustrates a table of equipment relationship attributes and their respective proximity attribute for different users in accordance with an embodiment of the present disclosure.

FIG. 9 illustrates an example of a method for standardizing proximity calculations in accordance with an embodiment of the present disclosure.

DETAILED DESCRIPTION

Figure 1:
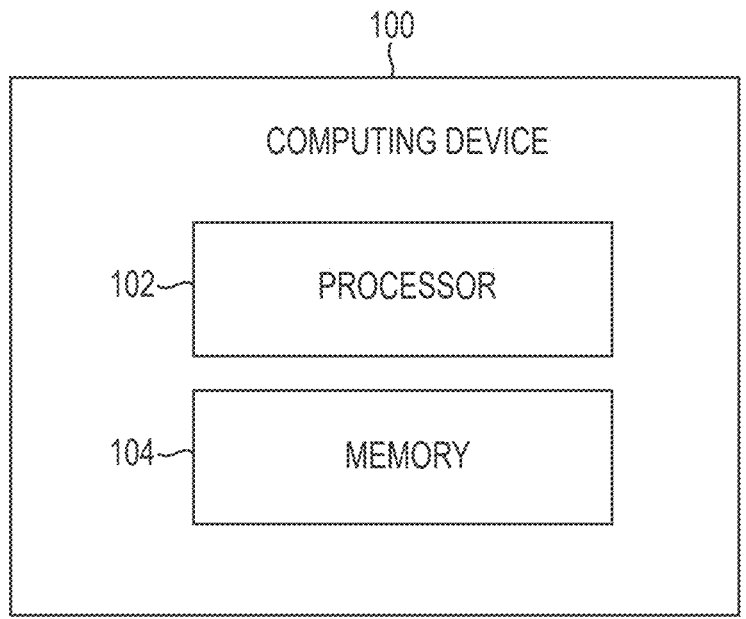
FIG. 1 illustrates a block diagram of a computing device in accordance with an embodiment of the present disclosure.

Devices, methods, and systems for standardizing proximity calculations are described herein. A method can include setting, by a computing device, a proximity attribute for each of a plurality of equipment relationship attributes for a user, receiving, by the computing device, a plurality of equipment items each having one of the plurality of equipment relationship attributes to another one of the plurality of equipment items, creating, by the computing device, a graph diagram including each of the plurality of equipment items coupled to one another by their respective equipment relationship attributes and the proximity attribute for their respective equipment relationship attributes, calculating, by the computing device using the graph diagram, a proximity between two of the plurality of equipment items, and providing, by the computing device, the calculated proximity to the user.

The concept of spatial distance is often not standardized in a system or across multiple systems in an enterprise. Hence when data is stored from a number of systems in one unified relationship graph model and a downstream consumer asks questions related to spatial distance spanning across systems, the output is often not correct or standardized as the relative definition of spatial distance can be different from system to system. The present disclosure addresses this problem by providing a framework to standardize the spatial distance attribute (e.g., proximity attribute) for calculating the proximity between equipment items of the enterprise.

As an example, a proximity attribute (e.g., a proximity distance of zero or one) can be set for each of a plurality of relationship attributes (e.g., connected to, sends feed to, alias of, and parent of) for a particular user, and a plurality of equipment items (e.g., assets) each having one of the plurality of equipment relationship attributes to another one of the plurality of equipment items can be received. A graph diagram that includes each of the plurality of equipment items coupled to one another by their respective equipment relationship attributes and the proximity attribute for the respective equipment relationship attributes can be created, and the proximity between two (or more) of the plurality of equipment items can be calculated using the graph diagram and provided to the user.

In some examples, a query for all equipment items up to a particular proximity from one of the equipment items can be received, the graph diagram can be scanned for all equipment items up to that proximity from one of the equipment items, and those equipment items that are found to be up to that proximity from that equipment item can be provided to the user. Further, different proximity attributes for the relationship attributes can be set for different users.

For example, if there are seven assets in a feed flow diagram that start with SYS1_TANK1 and end with SYS1_PCV1, there are 6 spatial distance hops from SYS1_TANK1 to sys1_PCV1. If the feed related reading in SYS1_PCV1 shows some anomaly in SYS1_PCV1, it is possible to create an intelligent agent which is configured to check the related reading up to 'n' hops in the asset relationship graph looking for a contributing cause for the anomaly. In this example, each hop can be a unit (e.g., level) of proximity. As such, SYS1_TANK1 is at a proximity level of 6 from SYS1_PCV1. If the contributing factor to the anomaly was connected to an out of limit parameter from SYS1_TANK1 then it is important to configure the intelligent agent to check for all assets up to proximity level 6 to discover the root cause.

However, if there is a different event and alarm management system in the same plant which also has the same SYS1_tank1 asset onboarded there for event monitoring purposes, it might be identified differently. For example, SYS1_tank1 may be identified as SYS2_TANK1 by the different event and alarm management system. In this case, if the event and alarm management system had an alarm notification generated for SYS2_TANK1 which is the same asset as SYS1_TANK1 but in the graph model it is another hop with a relations name of 'Alias of', that makes the proximity level of SYS2_TANK1 7 with respect to SYS1_PCV1. As the intelligent agent is configured to scan within a proximity radius of 6, the system will skip scanning for SYS2_TANK1 even though in the physical world, SYS1_TANK1 and SYS2_TANK1 are one and the same. Any alarm generated on SYS2_TANK1 should be considered for analysis of an anomaly in a SYS1_PCV1 reading.

A solution to this problem is to not consider 'Alias of' as a hop distance. But the real-world example in the industrial domain is not restricted to one such 'Alias of' relationship but full of such cases like an equipment "rolls up to" a unit or an area is 'part of' a 'site' where hop distance cannot be considered 1 or 0. Rather it depends on the consumer use case for which the downstream is requesting data.

However, the hop distance derivation cannot be left to downstream. A downstream consumer is supposed to be able to ask these questions without being explicitly aware of these intricacies during the runtime and be able to receive a simple answer related to proximity.

The present disclosure can solve the issues discussed above. For example, an "Alias of" relationship, in some circumstances, does not need to increment the proximity counter by 1. Instead, the proximity attribute can be ingested as a relationship attribute in the graph making. If each relationship is equipped with a proximity attribute, the query system can appropriately scan the assets and derive the appropriate proximity between any two nodes of the graph (e.g., any two assets) during the execution time of the query.

If there are two downstream consumers, and both have different interpretations of proximity for the same relationship, the proximity attribute with different attribute names for each relationship can be stored and while doing the query the appropriate proximity attribute can be considered based on the consumer's preference. The consumer specific proximity attributes can be included as a relationship attribute in the graph making. Also, the service can be aware of the consumer preferences while returning the proximity data.

If there is a situation where there are numerous downstream consumers each having different interpretations of proximity calculations with respect to relationships between two nodes, it may become impractical to populate all different proximity information in the graph database. In this case an extraction service can build a long chain of hop relationships. The individual relationships can then be translated to corresponding hop distances by referring to a metadata table.

This approach helps to create a graph-based storage system that provides real life spatial interpretation of equipment for the downstream consumer and provides the ability to scan a graph model and calculate proximity between equipment items based on a user preference.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 2, and a similar element may be referenced as 320 in FIG. 3.

As used herein, "a", "an", or "a number of" something can refer to one or more such things, while "a plurality of" something can refer to more than one such things. For example, "a number of equipment items" can refer to one or more equipment items, while "a plurality of equipment items" can refer to more than one equipment items.

FIG. 1 illustrates a block diagram of a computing device 100 in accordance with an embodiment of the present disclosure. In some examples, the computing device 100 can be a cloud computing device, a laptop computer, desktop computer, or mobile device, such as, for instance, a smart phone or tablet, among other types of computing devices.

The computing device 100 can include a processor 102 and a memory 104. Memory 104 can be any type of storage medium that can be accessed by processor 102 to perform various examples of the present disclosure. For example, memory 104 can be a non-transitory computer readable medium having non-transitory machine-readable instructions (e.g., computer program instructions) stored thereon that are executable by processor 102 to perform various examples of the present disclosure.

For instance, processor 102 can execute the executable instructions stored in memory 104 to set a proximity attribute for each of a plurality of equipment relationship attributes for a user, receive a plurality of equipment items each having one of the plurality of equipment relationship attributes to another one of the plurality of equipment items, create a graph diagram including each of the plurality of equipment items coupled to one another by their respective equipment relationship attributes and the proximity attribute for their respective equipment relationship attributes, receive a query for a proximity between two equipment items of the plurality of equipment items, calculate, using the graph diagram, the proximity between the two equipment items of the plurality of equipment items, and provide the calculated proximity between the two equipment items of the plurality of equipment items to the user.

Further, the instructions can cause the processor 102 to receive a different query for all equipment items up to a particular proximity from one of the plurality of equipment items, scan the graph diagram for all equipment items up to the particular proximity from the one of the plurality of equipment items, and provide the equipment items that are up to the particular proximity from the one of the plurality of equipment items to the user, wherein an equipment item of the provided equipment items that are up to the particular proximity have generated an alarm.

In a number of embodiments, the processor 102 can set each of the plurality of equipment relationship attributes as a connected to relationship, a send feed to relationship, an alias of relationship, or a parent of relationship. The processor 102 can set the proximity attribute for the user to one for the connected to relationship, one for the sends feed to relationship, zero for the alias of relationship, and one for the parent of relationship, for example.

A different query can be received by the processor 102 for all equipment items up to a particular proximity from one of the plurality of equipment items from the user. The processor 102 can scan the graph diagram for all equipment items up to the particular proximity from the one of the plurality of equipment items and can provide the equipment items that are up to the particular proximity from the one of the plurality of equipment items to the user. In some examples, the provided equipment items can include a first quantity of equipment items.

In a number of embodiments, the proximity attribute can be set by the processor 102 for a different user. For example, the connected to relationship can be set to one, the sends feed to relationship can be set to one, the alias of relationship can be set to one, and the parent of relationship can be set to one for the different user. In this instance, the proximity attribute for the alias of relationship is zero for the user and one for the different user.

The processor 102 can receive a different query for all equipment items up to the particular proximity for one of the plurality of equipment items from the different user. The graph diagram can be scanned by the processor 102 for all equipment items up to the particular proximity from the one of the plurality of equipment items. The processor 102 can provide the equipment items that are up to the particular proximity from the one of the plurality of equipment items to the different user, wherein the provided equipment items include a second quantity of equipment items.

The first quantity of equipment items can be different than the second quantity of items. For example, since the proximity attribute for the alias of relationship for the user is zero and the proximity attribute for the alias of relationship for the different user is one, it is possible that one or more additional equipment items can be provided in response to the query from the user than provided in response to the different query from the different user, as will be further described in connection with the description of the following Figures.

Figure 2:
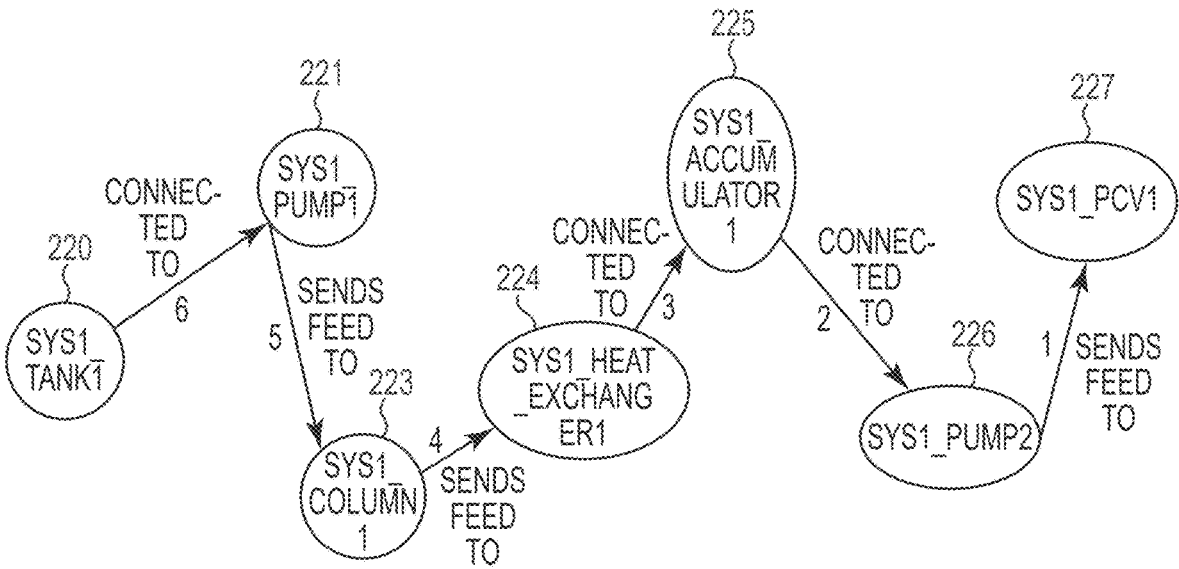
FIG. 2 illustrates a graph diagram including each of a plurality of equipment items coupled to one another by their respective equipment relationship attributes in accordance with an embodiment of the present disclosure.

FIG. 2 illustrates a graph diagram including each of a plurality of equipment items 220, 221, 223, 224, 225, 226, 227 coupled to one another by their respective equipment relationship attributes in accordance with an embodiment of the present disclosure. The plurality of equipment items 220, 221, 223, 224, 225, 226, 227 can be assets including equipment at an industrial site.

In a number of embodiments, the equipment items 220, 221, 223, 224, 225, 226, 227 can be process equipment used at an oil and gas refinery. For example, equipment item 220 can be a system tank (e.g., SYS1_TANK1), equipment item 221 can be a system pump (e.g., SYS1_PUMP1), equipment item 223 can be a system column (e.g., SYS1_COLUMN1), equipment item 224 can be a system heat exchanger (e.g., SYS1_HEAT_EXCHANGER1), equipment item 225 can be a system accumulator (e.g., SYS1_ACCUMULATOR1), equipment item 226 can be a system pump (e.g., SYS1_PUMP2), and equipment item 227 can be a pressure control valve (e.g., SYS1_PCV1).

A proximity attribute can be set for each of a plurality of relationship attributes. The proximity attribute can be a proximity distance of zero or one. Users can have a different proximity attribute for the same relationship attribute, as previously described in connection with FIG. 1.

Relationship attributes can include connected to, sends feed to, alias of, and parent of for a particular user. Each of the plurality of equipment items 220, 221, 223, 224, 225, 226, 227 can have one of the plurality of equipment relationship attributes to another one of the plurality of equipment items 220, 221, 223, 224, 225, 226, 227.

A graph diagram, as illustrated in the present FIG. 2, can include each of the plurality of equipment items 220, 221, 223, 224, 225, 226, 227 coupled to one another by their respective equipment relationship attributes. The equipment relationship attribute between equipment item 220 and equipment item 221 can be a connected to relationship. The equipment relationship attribute between equipment item 221 and equipment item 223 can be a sends feed to relationship. The equipment relationship attribute between equipment item 223 and equipment item 224 can be a sends feed to relationship. The equipment relationship attribute between equipment item 224 and equipment item 225 can be a connected to relationship. The equipment relationship attribute between equipment item 225 and equipment item 226 can be a connected to relationship and the equipment relationship attribute between equipment item 226 and equipment item 227 can be a sends feed to relationship.

The proximity attribute for the respective equipment relationship attributes can be created by each user. In the present example, the proximity attribute for the connected to relationship can be one and the sends feed to relationship can have a proximity attribute of one. However, different proximity attributes for the relationship attributes can be set for different users.

The proximity between two (or more) of the plurality of equipment items 220, 221, 223, 224, 225, 226, 227 can be calculated using the graph diagram of FIG. 2 and provided to a user. In some examples, a query for all equipment items up to a particular proximity from one of the equipment items 220, 221, 223, 224, 225, 226, 227 can be received, the graph diagram can be scanned for all equipment items up to that proximity from one of the equipment items 220, 221, 223, 224, 225, 226, 227, and those equipment items that are determined to be up to that proximity from that equipment item can be provided to the user.

In the present example illustrated in FIG. 2, there are seven equipment items 220, 221, 223, 224, 225, 226, 227 in a feed flow diagram. The feed flow diagram starts with equipment item 220 (e.g., SYS1_TANK1) and ends with equipment item 227 (e.g., SYS1_PCV1). There are 6 spatial distance hops from equipment item 220 to equipment item 227. For example, as illustrated in FIG. 2, equipment item 227 is one distance hop from equipment item 226, two distance hops from equipment item 225, three distance hops from equipment item 224, four distance hops from equipment item 223, five distance hops from equipment item 221, and six distance hops from equipment item 220.

If the feed related reading in equipment item 227 shows some anomaly in equipment item 227, it is possible to create an intelligent agent which is configured to check the related reading up to 'n' number of hops in the asset relationship graph looking for a contributing cause for the anomaly. In this example, each hop can be a unit (e.g., level) of proximity. As such, equipment item 220 is at a proximity level of 6 from equipment item 227. If the contributing factor to the anomaly was connected to an out of limit parameter from equipment item 220 then it is important to configure the intelligent agent to check for all assets up to proximity level 6 to discover the root cause.

Figure 3:
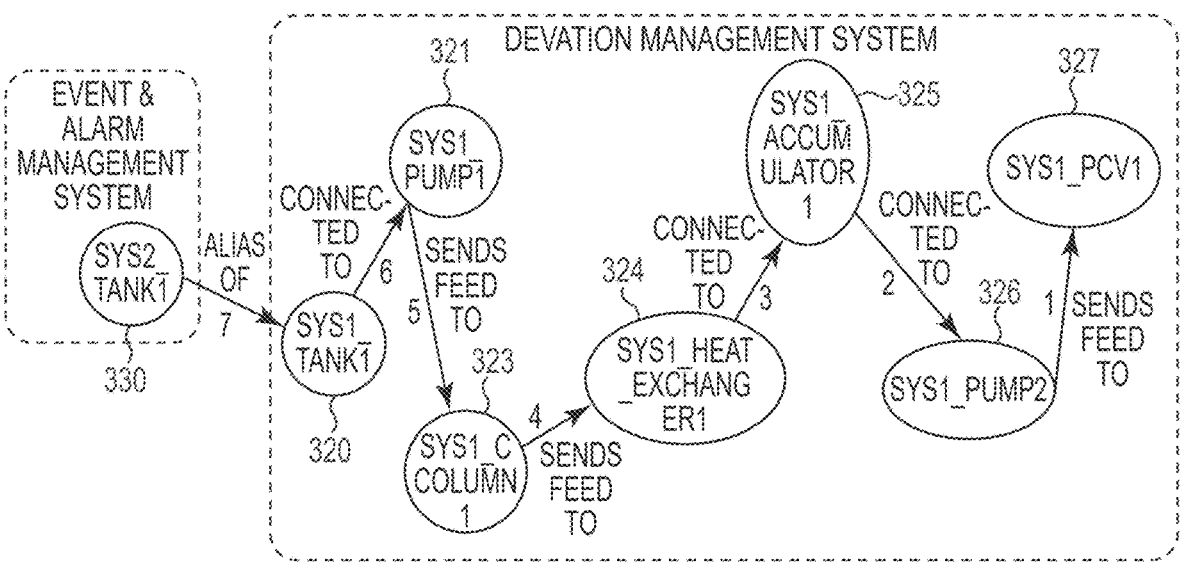
FIG. 3 illustrates a graph diagram of an event and alarm management system and a deviation management system including each of a plurality of equipment items coupled to one another by their respective equipment relationship attributes in accordance with an embodiment of the present disclosure.

FIG. 3 illustrates a graph diagram of an event and alarm management system and a deviation management system including each of a plurality of equipment items coupled to one another by their respective equipment relationship attributes in accordance with an embodiment of the present disclosure. Equipment item 320 can correspond to equipment item 220 of FIG. 2, equipment item 321 can correspond to equipment item 221 of FIG. 2, equipment item 323 can correspond to equipment item 223 of FIG. 2, equipment item 324 can correspond to equipment item 224 of FIG. 2, equipment item 325 can correspond to equipment item 225 of FIG. 2, equipment item 326 can correspond to equipment item 226 of FIG. 2, and equipment item 327 can correspond to equipment item 227 of FIG. 2.

The equipment items 320, 321, 323, 324, 325, 326, and 327 can be included in a deviation management system. The deviation management system can be a structured process that identifies, documents, investigates, and/or addresses any unplanned events or variations that deviate from established operating procedures.

In a number of embodiments, there might be an event and alarm management system in the same plant as the deviation management system. The event and alarm management system can be used to notify a user (e.g., operator) when a process is working outside its predetermined safe and/or optimum operating limits. When such a process alarm is triggered, the operator is supposed to take action(s) to bring parameters of the process back within the safe and/or optimum operating limits.

The alarm management system can have the same equipment item onboarded as the deviation management system and/or another alarm management system. However, the equipment item may be identified differently from the deviation management system and/or the other alarm management system.

For example, equipment item 320 may be identified as equipment item 330 (e.g., SYS2_TANK1) by the event and alarm management system. In the present example, the event and alarm management system can have an alarm notification generated for equipment item 330 which is the same asset as equipment item 320. In the graph model illustrated in FIG. 3, it is an additional hop with an alias of relationship to equipment item 330, that makes the proximity level of equipment item 330 seven with respect to equipment item 327.

If a processor (e.g., processor 102 of FIG. 1) is configured to scan within a proximity radius of 6, the processor will skip scanning for equipment item 330 even though in the physical world, equipment item 320 and equipment item 330 are one and the same and thus would be within the proximity radius of six of equipment item 327. Accordingly, any alarm generated on equipment item 330 should be considered for analysis of an anomaly in an equipment item 327 reading.

A solution to this problem is to not consider an alias of relationship as a hop distance. But the real-world example in the industrial domain is not restricted to an alias of relationship but full of such cases where hop distance cannot be considered 1 or 0. Rather it depends on the user use case for which the downstream is requesting data.

However, the hop distance derivation cannot be left to a downstream user. A downstream user is supposed to be able to ask these questions without being explicitly aware of these intricacies during the runtime and be able to receive a simple answer related to proximity. This can be addressed utilizing an equipment relationship attribute table, as described in connection with FIG. 4.

FIG. 4 illustrates a table of equipment relationship attributes 440 and their respective proximity attribute 442 in accordance with an embodiment of the present disclosure.

Equipment relationship attributes 440 can include, but are not limited to connected to, sends feed to, alias of, and parent of relationships.

In the present example, the proximity attribute 442 for the connected to relationship can be one, the sends feed to relationship can be one, and the parent of relationship can be one. However, to solve the issues discussed above, the alias of relationship, in some circumstances, does not need to have a proximity attribute 442 of one. Instead, the proximity attribute 442 for the alias of relationship can be zero, as shown in FIG. 4.

Figure 5:
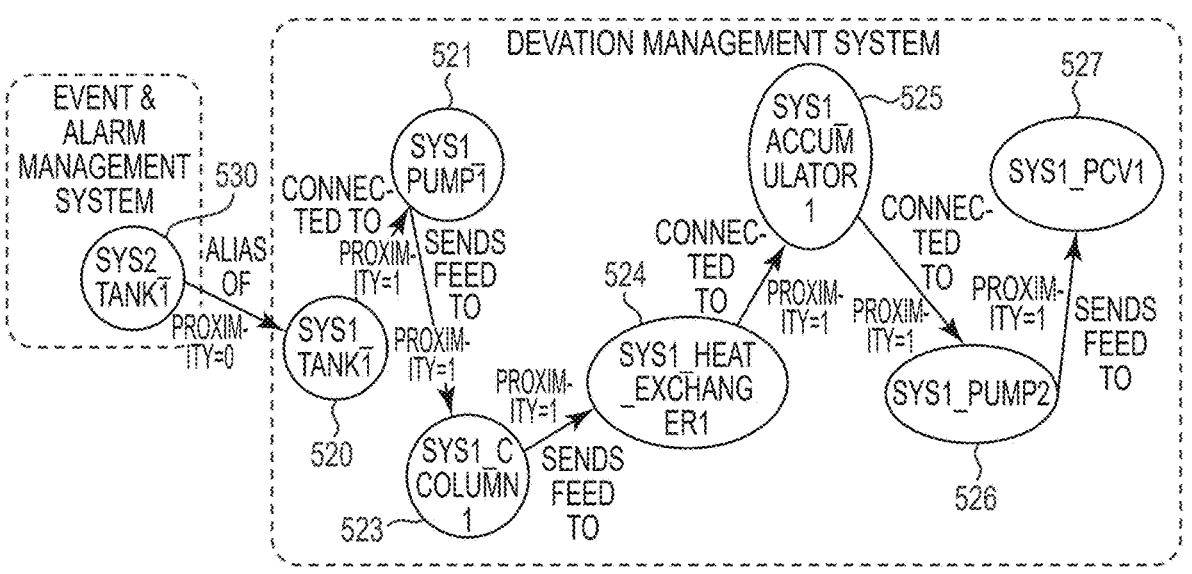
FIG. 5 illustrates a graph diagram of an event and alarm management system and a deviation management system including each of a plurality of equipment items coupled to one another by their respective equipment relationship attributes in accordance with an embodiment of the present disclosure.

FIG. 5 illustrates a graph diagram of an event and alarm management system and a deviation management system including each of a plurality of equipment items 520, 521, 523, 524, 525, 526, 527, and 530 coupled to one another by their respective equipment relationship attributes in accordance with an embodiment of the present disclosure. Equipment item 520 can correspond to equipment items 220 and 320 of FIGS. 2 and 3, respectively. Equipment item 521 can correspond to equipment items 221 and 321 of FIGS. 2 and 3, respectively. Equipment item 523 can correspond to equipment items 223 and 323 of FIGS. 2 and 3, respectively. Equipment item 524 can correspond to equipment items 224 and 324 of FIGS. 2 and 3, respectively. Equipment item 525 can correspond to equipment items 225 and 325 of FIGS. 2 and 3, respectively. Equipment item 526 can correspond to equipment items 226 and 326 of FIGS. 2 and 3, respectively. Equipment item 527 can correspond to equipment items 227 and 327 of FIGS. 2 and 3, respectively. Equipment item 530 can correspond to equipment item 330 of FIG. 3.

As previously discussed in connection with FIG. 3, the alarm management system can have the same equipment item onboarded as the deviation management system. However, the equipment item may be identified differently in the event and alarm management system than in the deviation management system. For example, equipment item 520 may be identified as equipment item 530 (e.g., SYS2_TANK1) by the event and alarm management system. In the present example, the event and alarm management system can have an alarm notification generated for equipment item 530 which is the same asset as equipment item 520. In the graph model, it is not considered a hop when the alias of relationship has a proximity attribute of zero, which makes the proximity level of equipment item 530 six with respect to equipment item 527.

If a processor (e.g., processor 102 of FIG. 1) is configured to scan within a proximity radius of 6, for example, the processor will include equipment item 530 in the results of the scan. Accordingly, any alarm generated on equipment item 530 can be considered for analysis of an anomaly in an equipment item 527 reading.

FIG. 6 illustrates a table of equipment relationship attributes 640 and their respective proximity attribute 642-1 and 642-2 for different users in accordance with an embodiment of the present disclosure. Equipment relationship attributes 640 can include, but are not limited to connected to, sends feed to, alias of, and parent of relationships.

In a number of embodiments, the proximity attributes 642-1 and 642-2 can be set based on the user. In the present example, there are two different users, user A and user B, with user A setting proximity attributes 642-1 and user B setting proximity attributes 642-2.

The proximity attribute 642-1 and 642-2 for the connected to relationship can be one for both user A and user B. The sends feed to relationship can be one for the proximity attribute 642-1 and 642-2 for both user A and user B. The proximity attribute 642-1 and 642-2 for the parent of relationship can be one for both user A and user B. However, for the alias of relationship, the proximity attribute 642-1 is zero for User A, while the proximity attribute 642-2 is one for User B. This makes it possible that the same query from user A and user B may result in user A receiving a different output than user B (e.g., when there is an alias of relationship between equipment items), as will be further described in connection with FIG. 7.

Figure 7:
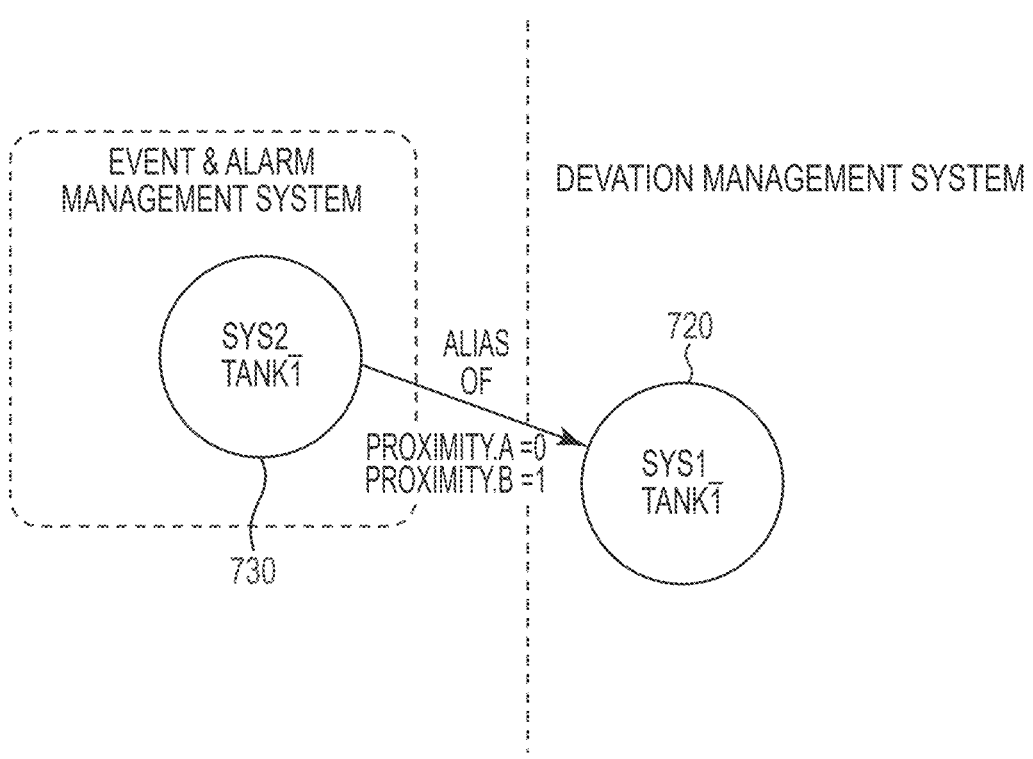
FIG. 7 illustrates a graph diagram of an event and alarm management system and a deviation management system including each of a plurality of equipment items coupled to one another by their respective equipment relationship attributes in accordance with an embodiment of the present disclosure.

FIG. 7 illustrates a graph diagram of an event and alarm management system and a deviation management system including each of a plurality of equipment items 720 and 730 coupled to one another by their respective equipment relationship attributes in accordance with an embodiment of the present disclosure. Equipment item 720 can correspond to equipment items 220, 320, and 520 of FIGS. 2, 3, and 5, respectively. Equipment item 730 can correspond to equipment items 330 and 530 of FIGS. 3 and 5, respectively.

If there are two downstream users (e.g., users A and B previously described in connection with FIG. 6), and both have different proximity attributes for the same equipment relationship attribute, the different proximity attributes for the same equipment relationship attribute can be stored for each user in memory (e.g., memory 104 of FIG. 1). While executing a query, the appropriate proximity attribute can be used based on which user is submitting the query. The user specific proximity attributes can be included in the graph making. Also, a processor (e.g., processor 102 of FIG. 1) can be aware of the user preferences while returning the proximity data.

If there is a situation where there are numerous downstream users each having different interpretations of proximity calculations with respect to relationships between two equipment items 720 and 730, it may become impractical to populate all different proximity information in a graph database. In this case an extraction service can build a chain of equipment relationship attributes. The individual equipment relationship attributes can then be translated to corresponding proximity attributes by referring to a metadata table. In a number of embodiments, the graph database and/or the metadata table can be stored in the memory.

As previously discussed in connection with FIGS. 3 and 5, the alarm management system can have the same equipment item onboarded as the deviation management system. However, the equipment item may be identified differently from the deviation management system.

For example, equipment item 720 (e.g., SYS1_TANK1) may be identified as equipment item 730 (e.g., SYS2_TANK1) by the event and alarm management system. In the present example, the event and alarm management system can have an alarm notification generated for equipment item 730 which is the same asset as equipment item 720.

The processor may or may not include the alarm notification generated for equipment item 730 in its output depending on which user submitted the query. For example, if user A submitted the query, the proximity attribute of zero is used for the proximity calculation. If user B submitted the same query, the proximity attribute of one is used in the proximity calculations. If the query requests the processor to scan within a proximity radius of 6 from equipment item 527 of FIG. 5, for example, the processor will include equipment item 730 for user A, but not for user B. Accordingly, user A will see the alarm generated on equipment item 730, while user B will not.

Figure 8:
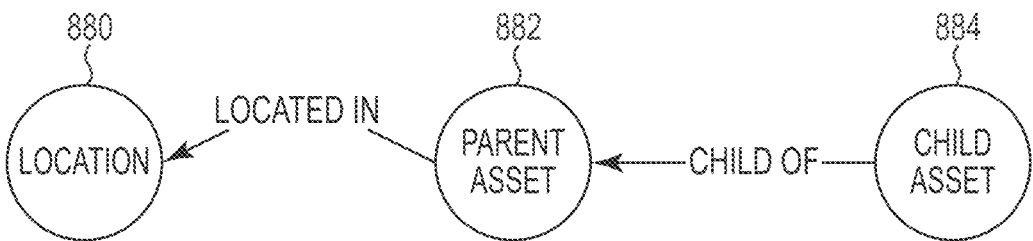
FIG. 8 illustrates a relationship flow diagram in accordance with an embodiment of the present disclosure.

FIG. 8 illustrates a relationship flow diagram in accordance with an embodiment of the present disclosure. The relationship flow diagram can include a location 880, a parent asset 882, and a child asset 884. The location 880, the parent asset 882, and the child asset 884 can be linked by relationship attributes including located in and child of relationships, as illustrated in FIG. 8.

The relationship flow diagram can provide real life spatial interpretation of equipment for downstream users. Further, the flow diagram provides the ability to scan a graph model and calculate proximity between equipment items based on a user's preferences.

FIG. 9 illustrates an example of a method 990 for standardizing proximity calculations in accordance with an embodiment of the present disclosure. Method 990 can be performed by, for example, computing device 100 described in connection with FIG. 1.

At block 991, method 990 includes setting a proximity attribute for each of a plurality of equipment relationship attributes for a user. One of the equipment relationship attributes can be an alias relationship, for example.

At block 992, method 990 includes receiving a plurality of equipment items each having one of the plurality of equipment relationship attributes to another one of the plurality of equipment items. The equipment relationship attributes can include an alias of relationship, a connected to relationship, a sends feed to relationship, and a parent of relationship, as previously described herein.

At block 993, method 990 includes creating a graph diagram, such as, for instance, the graph diagrams described in connection with FIGS. 2, 3, 5, and 7, including each of the plurality of equipment items coupled to one another by their respective equipment relationship attributes and the proximity attribute for their respective equipment relationship attributes. In some examples, the proximity attribute for the alias relationship can be set as zero.

At block 994, method 990 includes calculating, using the graph diagram, a proximity between two of the plurality of equipment items. In a number of embodiments, the graph diagram can include a number of event and alarm management systems and/or a number of deviation management systems.

At block 995, method 990 includes providing the calculated proximity to the user. The calculated proximity can be provided to the user via a user interface. The user interface can be included in the computing device and/or a user device, for example.

In some examples, the method 990 can include receiving a query for all equipment items up to a particular proximity from one of the plurality of equipment items. The method 990 can further include scanning the graph diagram for all equipment items up to the particular proximity from the one of the plurality of equipment items and providing the equipment items that are up to the particular proximity from the one of the plurality of equipment items to the user. The equipment items that are up to the particular proximity from the one of the plurality of equipment items can be provided to the user via the user interface.

In a number of embodiments, the method 990 can include setting a different proximity attribute for each of the plurality of equipment relationship attributes for a different user. Creating a different graph diagram including each of the plurality of equipment items coupled to one another by their respective equipment relationship attributes for the different user and their proximity attribute for their respective equipment relationship attributes for the different user and calculating, using the different graph diagram, a proximity between two of the plurality of equipment items can be included in the method 990. In some examples, one of the plurality of equipment relationship attributes for the different user is an alias relationship and the proximity attribute for the alias relationship for the different user can be set as one.

Figure 10:
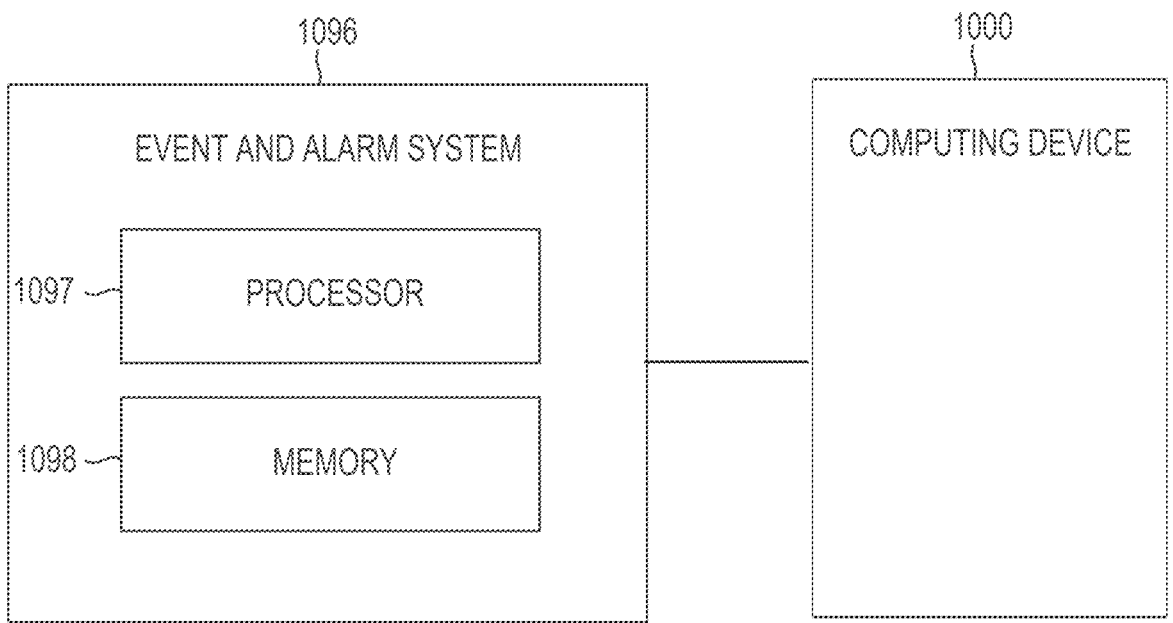
FIG. 10 illustrates a block diagram of a system including an event and alarm system coupled to a computing device in accordance with an embodiment of the present disclosure.

FIG. 10 illustrates a block diagram of a system including an event and alarm system 1096 coupled to a computing device 1000 in accordance with an embodiment of the present disclosure. Computing device 1000 can correspond to computing device 100 of FIG. 1. The event and alarm system 1096 can be used to notify a user when a process is working outside its predetermined safe and/or optimum operating limits. In some examples, the event and alarm system 1096 can be a cloud computing device, a laptop computer, desktop computer, or mobile device, such as, for instance, a smart phone or tablet, among other types of computing devices.

The computing device 1000 can set a proximity attribute for each of a plurality of equipment relationship attributes for a user, receive a plurality of equipment items, including a first equipment item and a second equipment item, each having one of the plurality of equipment relationship attributes to another one of the plurality of equipment items, and create a graph diagram including each of the plurality of equipment items coupled to one another by their respective equipment relationship attributes and the proximity attribute for their respective equipment relationship attributes.

The event and alarm system 1096 can include a processor 1097 and a memory 1098. Memory 1098 can be any type of storage medium that can be accessed by processor 1097 to perform various examples of the present disclosure. For example, memory 1098 can be a non-transitory computer readable medium having non-transitory machine-readable instructions (e.g., computer program instructions) stored thereon that are executable by processor 1097 to perform various examples of the present disclosure. For instance, processor 1097 can execute the executable instructions stored in memory 1098 to generate an alarm for an equipment item (e.g., a third equipment item) of a plurality of equipment items.

The computing device 1000 can receive a query for all equipment items up to a particular proximity from the first equipment item of the plurality of equipment items, scan the graph diagram for all equipment items up to the particular proximity from the first equipment item, and provide the equipment items, including the second equipment item, that are up to the particular proximity from the first equipment item to the user. In some examples, the second equipment item can be the same as the third equipment item.

In a number of embodiments, the computing device 1000 can set an equipment relationship attribute of the second equipment item and the third equipment item as an alias of relationship and set a proximity attribute for the user to zero for the alias of relationship. The computing device 1000 can provide the equipment items, including the second equipment item and the third equipment item, that are up to the particular proximity from the first equipment item to the user responsive to setting the proximity attribute for the user to zero for the alias of relationship. In contrast, the computing device 1000 can provide the equipment items, including the second equipment item, that are up to the particular proximity from the first equipment item to the user responsive to setting the proximity attribute for the user to one for the alias of relationship.

In some examples, computing device 1000 can monitor and control components and receive data from the event and alarm system 1096 and/or a deviation management system (e.g., deviation management system previously described in connection with FIGS. 3, 5, and 7) via a wired or wireless network (not shown in FIG. 10 for simplicity and so as not to obscure embodiments of the present disclosure). The network can be a network relationship through which the computing device 1000, the event and alarm system 1096, and/or the deviation management system can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   setting, by a computing device, a proximity attribute for each of a plurality of equipment relationship attributes for a user:

receiving, by the computing device, a plurality of equipment items each having one of the plurality of equipment relationship attributes to another one of the plurality of equipment items;

creating, by the computing device, a graph diagram including each of the plurality of equipment items coupled to one another by their respective equipment relationship attributes and the proximity attribute for their respective equipment relationship attributes:

calculating, by the computing device using the graph diagram, a proximity between two of the plurality of equipment items;

providing, by the computing device, the calculated proximity to the user;

wherein the method further comprises:

setting a different proximity attribute for each of the plurality of equipment relationship attributes for a different user;

creating a different graph diagram including each of the plurality of equipment items coupled to one another by their respective equipment relationship attributes for the different user and their proximity attribute for their respective equipment relationship attributes for the different user;

calculating, using the different graph diagram, another proximity between two of the plurality of equipment items, and providing, by the computing device, the other proximity to the user.

2. The method of claim 1, further comprising:

receiving a query for all equipment items up to a particular proximity from one of the plurality of equipment items;

scanning the graph diagram for all equipment items up to the particular proximity from the one of the plurality of equipment items; and providing the equipment items that are up to the particular proximity from the one of the plurality of equipment items to the user.

3. The method of claim 1, wherein one of the plurality of equipment relationship attributes is an alias of relationship.

4. The method of claim 3, wherein the proximity attribute for the alias of relationship is set as zero.

5. The method of claim 1, wherein:

one of the plurality of equipment relationship attributes for the different user is an alias of relationship; and the proximity attribute for the alias of relationship for the different user is set as one.

6. A computing device, comprising:

a processor; and a memory storing non-transitory machine-readable instructions to cause the processor to:

set a proximity attribute for each of a plurality of equipment relationship attributes for a user;

receive a plurality of equipment items each having one of the plurality of equipment relationship attributes to another one of the plurality of equipment items;

create a graph diagram including each of the plurality of equipment items coupled to one another by their respective equipment relationship attributes and the proximity attribute for their respective equipment relationship attributes;

receive a query for a proximity between two equipment items of the plurality of equipment items;

calculate, using the graph diagram, the proximity between the two equipment items of the plurality of equipment items;

provide the calculated proximity between the two equipment items of the plurality of equipment items to the user;

wherein the instructions cause the processor to:

set a different proximity attribute for each of the plurality of equipment relationship attributes for a different user;

create a different graph diagram including each of the plurality of equipment items coupled to one another by their respective equipment relationship attributes for the different user and their proximity attribute for their respective equipment relationship attributes for the different user;

calculate, using the different graph diagram, another proximity between two of the plurality of equipment items; and provide the other proximity between the two equipment items of the plurality of equipment items to the different user.

7. The computing device of claim 6, wherein the instructions cause the processor to:

receive a different query for all equipment items up to a particular proximity from one of the plurality of equipment items;

scan the graph diagram for all equipment items up to the particular proximity from the one of the plurality of equipment items; and provide the equipment items that are up to the particular proximity from the one of the plurality of equipment items to the user, wherein an equipment item of the provided equipment items that are up to the particular proximity have generated an alarm.

8. The computing device of claim 6, wherein the instructions cause the processor to set each of the plurality of equipment relationship attributes as a connected to relationship, a sends feed to relationship, an alias of relationship, or a parent of relationship.

9. The computing device of claim 8, wherein the instructions cause the processor to set the proximity attribute for the user to one for the connected to relationship, one for the sends feed to relationship, zero for the alias of relationship, and one for the parent of relationship.

10. The computing device of claim 9, wherein the instructions cause the processor to:

receive a different query for all equipment items up to a particular proximity from one of the plurality of equipment items from the user;

scanning the graph diagram for all equipment items up to the particular proximity from the one of the plurality of equipment items; and providing the equipment items that are up to the particular proximity from the one of the plurality of equipment items to the user, wherein the provided equipment items include a first quantity of equipment items.

11. The computing device of claim 10, wherein the instructions cause the processor to set the proximity attribute for a different user to one for the connected to relationship, one for the sends feed to relationship, one for the alias of relationship, and one for the parent of relationship.

12. The computing device of claim 11, wherein the instructions cause the processor to:

receive the different query for all equipment items up to the particular proximity from one of the plurality of equipment items from the different user;

scanning the graph diagram for all equipment items up to the particular proximity from the one of the plurality of equipment items; and providing the equipment items that are up to the particular proximity from the one of the plurality of equipment items to the user, wherein the provided equipment items include a second quantity of equipment items.

13. The computing device of claim 12, wherein the first quantity of equipment items is different than the second quantity of equipment items.

14. A system, comprising:

a computing device configured to:

set a proximity attribute for each of a plurality of equipment relationship attributes for a user;

receive a plurality of equipment items, including a first equipment item and a second equipment item, each having one of the plurality of equipment relationship attributes to another one of the plurality of equipment items; and create a graph diagram including each of the plurality of equipment items coupled to one another by their respective equipment relationship attributes and the proximity attribute for their respective equipment relationship attributes;

set a different proximity attribute for each of the plurality of equipment relationship attributes for a different user; and create a different graph diagram including each of the plurality of equipment items coupled to one another by their respective equipment relationship attributes for the different user and their proximity attribute for their respective equipment relationship attributes for the different user;

an event and alarm system coupled to the computing device, wherein the event and alarm system is configured to generate an alarm for a third equipment item of a plurality of equipment items;

wherein the computing device is further configured to:

receive a query for all equipment items up to a particular proximity from the first equipment item of the plurality of equipment items;

scan the graph diagram for all equipment items up to the particular proximity from the first equipment items; and provide the equipment items, including the second equipment item, that are up to the particular proximity from the first equipment item to the user.

15. The system of claim 14, wherein the second equipment item is the same as the third equipment item.

16. The system of claim 15, wherein the computing device is configured to:

set an equipment relationship attribute of the second equipment item and the third equipment item as an alias of relationship; and set a proximity attribute for the user to zero for the alias of relationship.

17. The system of claim 16, wherein the computing device is configured to provide the equipment items, including the second equipment item and the third equipment item, that are up to the particular proximity from the first equipment item to the user responsive to setting the proximity attribute for the user to zero for the alias of relationship.

18. The system of claim 16, wherein the computing device is configured to provide the equipment items, including the second equipment item, that are up to the particular proximity from the first equipment item to the user responsive to setting the proximity attribute for the user to one for the alias of relationship.

* * * * *